United States Patent [19]

Sekiguchi

[11] Patent Number: 5,663,622
[45] Date of Patent: Sep. 2, 1997

[54] POSITIONING CONTROL SYSTEM

[75] Inventor: Hiroyuki Sekiguchi, Utsunomiya, Japan

[73] Assignee: Canon Kabushiki Kaisha, Tokyo, Japan

[21] Appl. No.: 522,071

[22] Filed: Aug. 31, 1995

[30] Foreign Application Priority Data

Sep. 5, 1994 [JP] Japan .................... 6-234478

[51] Int. Cl.[6] .................... H01L 21/68; G05B 9/02
[52] U.S. Cl. .................... 318/563; 318/626; 318/466
[58] Field of Search .................... 318/563, 626, 318/264–266, 286, 466–470

[56] References Cited

U.S. PATENT DOCUMENTS 3,590,529  7/1971  Purdy .
3,609,390  9/1971  Feldman .
4,234,833  11/1980  Barrett .
4,514,670  4/1985  Fassel et al. .................... 318/467
4,910,445  3/1990  Borrmann .................... 318/468
4,918,360  4/1990  Tanaka et al. .................... 318/41

*Primary Examiner*—Bentsu Ro
*Attorney, Agent, or Firm*—Fitzpatrick, Cella, Harper & Scinto

[57] ABSTRACT

A positioning control system for positioning a movement member with respect to a predetermined position on the basis of feedback control of a driving system for the movement member, includes an extraordinary movement detecting device for detecting extraordinary movement of the movement member, and an emergency stoppage servo device for applying a signal for stopping the driving system in response to output of a detection signal from the extraordinary movement detecting device.

5 Claims, 3 Drawing Sheets

POSITIONING CONTROL SYSTEM

FIELD OF THE INVENTION AND RELATED ART

This invention relates to a positioning control system for a movement member and, more particularly, to a positioning control system having measures to uncontrolled running of a movement member for which very precise positioning is required.

As for the measures for uncontrolled running in a positioning control system, in an example a mechanical stopper or a limit switch is used. In another example, uncontrolled run detecting means is provided to detect disagreement between a drive signal and the operation of a motor and, when it is detected, the run is braked.

SUMMARY OF THE INVENTION

However, these examples involve the following problems:

(1) If the uncontrolled running is stopped by using a mechanical stopper, it produces a large impact which may cause a serious damage to a precision stage or the like which is a movement member. This may result in deterioration of the positioning precision or, in a worst case, it ends in breakage of the stage.

(2) If a limit switch is used to stop uncontrolled run, application of sudden breaking may cause a serious damage to the movement member, for a similar reason as that of case (1). If the movement speed is gradually lowered in response to detection by the limit switch in an attempt to avoiding this problem, it is not easy to predict the movement speed of the uncontrolled running beforehand. Thus, it needs a large stroke before stoppage of the movement member after it goes beyond the limit switch. Practically, therefore, it is not possible to adopt this method.

(3) In the method of detecting uncontrolled running wherein disagreement between the drive signal and the motor operation is detected and the running is braked, it is not possible to detect uncontrolled running if the drive signal itself is out of order. Particularly, in a software servo system, there is not a small possibility of incorrect parameter inputting or bugs of programs, which causes application of incorrect drive signal and, as a result, uncontrolled running of the movement member. In such case, this method is not effective.

It is accordingly an object of the present invention to provide a positioning control system having effective measures for uncontrolled running of a movement member, by which, even if a drive signal itself is out of order and uncontrolled running of the movement member is produced, the uncontrolled running can be detected and, additionally, the movement member can be stopped at a safe acceleration not damaging the movement member.

In accordance with an aspect of the present invention, there is provided a positioning control system for positioning a movement member with respect to a predetermined position on the basis of feedback control of driving means for the movement member, said system comprising: extraordinary movement detecting means for detecting extraordinary movement of the movement member; and emergency stoppage servo means for applying a signal for stopping said driving means in response to output of a detection signal from said extraordinary movement detecting means.

Said extraordinary movement detecting means may discriminate occurrence of uncontrolled running of the movement member when the movement member exceeds a tolerable maximum speed which is predetermined with respect to a current position of the movement member.

The tolerable maximum speed may correspond to a speed at which the movement member is able to be stopped within a movable range of the movement member from the current position thereof, with an acceleration not larger than a tolerable acceleration.

Said emergency stoppage servo means may be arranged to stop the movement member at an acceleration which is tolerable to the movement member.

In a more specific form of this aspect of the present invention, the system may further comprise (i) current position detecting means for detecting a current position of the movement member and for producing a corresponding current position signal and (ii) ordinary servo means for applying, to said driving means, a drive signal to move and place the movement member at a predetermined target position on the basis of a difference between a corresponding target position signal and the current position signal, wherein said extraordinary movement detecting means may detect extraordinary movement of the movement member on the basis of a current position signal and wherein said emergency stoppage servo means may apply an emergency stoppage signal to said driving means on the basis of a current position signal.

In accordance with this aspect of the present invention, if it is detected that the movement speed of the movement member exceeds a tolerable maximum speed which is predetermined with respect to a current position of the movement member, at which speed the movement member is able to be stopped within a movable range of the movement member at an acceleration not larger than a maximum acceleration tolerable to the movement member, the movement of the movement member is discriminated as being uncontrolled running. In that occasion, emergency stoppage servo control for stopping the movement member with a maximum acceleration tolerable to the movement member, which control is separate from ordinary positioning servo control, is performed.

Thus, even if a drive signal applied to the driving means itself is out of order and, as a result, uncontrolled running of the movement member is caused, such uncontrolled run is detected and, additionally, the movement member is then stopped within the movable range of the movement member with a safe acceleration not damaging the movement member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be explained in conjunction with the drawings.

Figure 1:
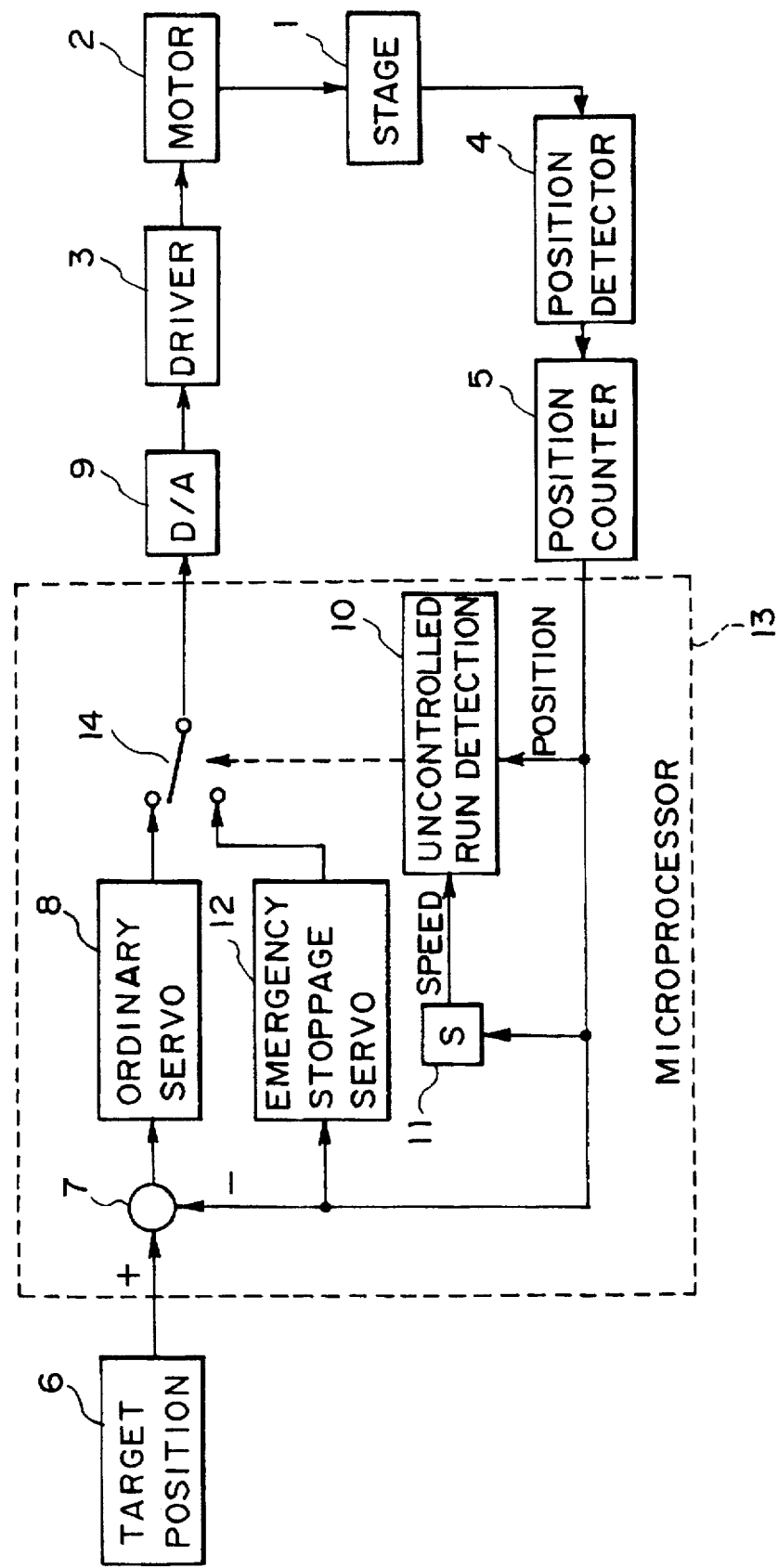
FIG. 1 is a block diagram of a positioning control system according to an embodiment of the present invention.

FIG. 1 is a block diagram of a stage positioning control system according to an embodiment of the present invention. In FIG. 1, denoted at 1 is a stage (movement member). Denoted at 2 is a driving motor for the stage 1, and denoted at 3 is a driver for driving the motor 2. Denoted at 4 is a position detector such as a laser interferometer, for example, for measuring the position of the stage 1. Denoted at 5 is a current position counter for counting the current position of the stage 1 on the basis of an output of the position detector 4. Denoted at 6 is a target position (destination) of the stage 1 which is specified by a superior host computer, for example. Denoted at 13 is a microprocessor such as MPU or DSP, for example, which serves to calculate a drive signal to be applied to the motor, through digital control and in accordance with the current position information, to controllably move the stage 1 to the target position. Denoted at 9 is a digital-to-analog (D/A) converter for transforming the drive signal to an analog voltage and for applying it to the driver 3.

The microprocessor 13 accomplishes the functions of those blocks within a broken line in the drawing, with a software. Denoted at 7 is a differencing circuit for calculating a positional difference on the basis of a target position 6 and a current position as outputted from the position counter 5. Denoted at 8 is a servo operation routine for performing servo operation in an ordinary position control mode in accordance with an output of the differencing circuit 7. Denoted at 12 is an emergency stoppage servo operation routine for stopping the stage 1 at the time of uncontrolled running or overrunning of the same, on the basis of a current position as outputted from the position counter 5. Denoted at 14 is a switch for changing the output to the D/A converter 9 between the ordinary servo operation routine 8 and the emergency stoppage servo operation routine. Denoted at 11 is a differential routine for detecting the speed on the basis of a change in current position as outputted from the position counter 5. Denoted at 10 is an uncontrolled running detection routine for continuously monitoring occurrence of uncontrolled running on the basis of the speed and the current position, and for changing, if uncontrolled running is detected, the output to be applied to the D/A converter 9 from the ordinary servo operation routine 8 to the emergency stoppage servo operation routine, through cooperation of the switch 14.

With the arrangement described above, in the ordinary positioning control mode and when a target position 6 is given, the differencing circuit 7 operates to calculate the difference between the target position 6 and the current position of the stage 1, and a drive signal is calculated through the ordinary servo operation routine 8. The thus produced drive signal is transformed by the D/A converter 9 into a corresponding analog voltage which is then converted by the driver 3 into a corresponding electric current. This electric current is applied to drive the motor 2, whereby the stage 1 is moved. The position of the stage 1 is measured by the position detector 4. The current position of the stage is detected through the position counter 5, and it is fed back to the servo operation routine 8 and, finally, the stage 1 is moved and positioned at its target position.

During this process, the uncontrolled running detection routine 10 serves to detect uncontrolled running, as follows:

It is assumed that a maximum acceleration as tolerable to the stage 1 is represented by a. Also, it is assumed that the current position of the stage 1 is denoted by x, and that the soft limit position in the direction in which the stage 1 is being moved is denoted by L. Additionally, the speed of the stage 1 is denoted by v. The uncontrolled running detection routine 10 continuously monitors the current position x and the speed v of the stage 1. When they come to satisfy equation (1), below, namely, the speed with which the stage is able to be stopped at or before the soft limit position with the acceleration a, "uncontrolled running" is discriminated.

$$v > \sqrt{2a(L-x)} \quad (1)$$

Figure 2:
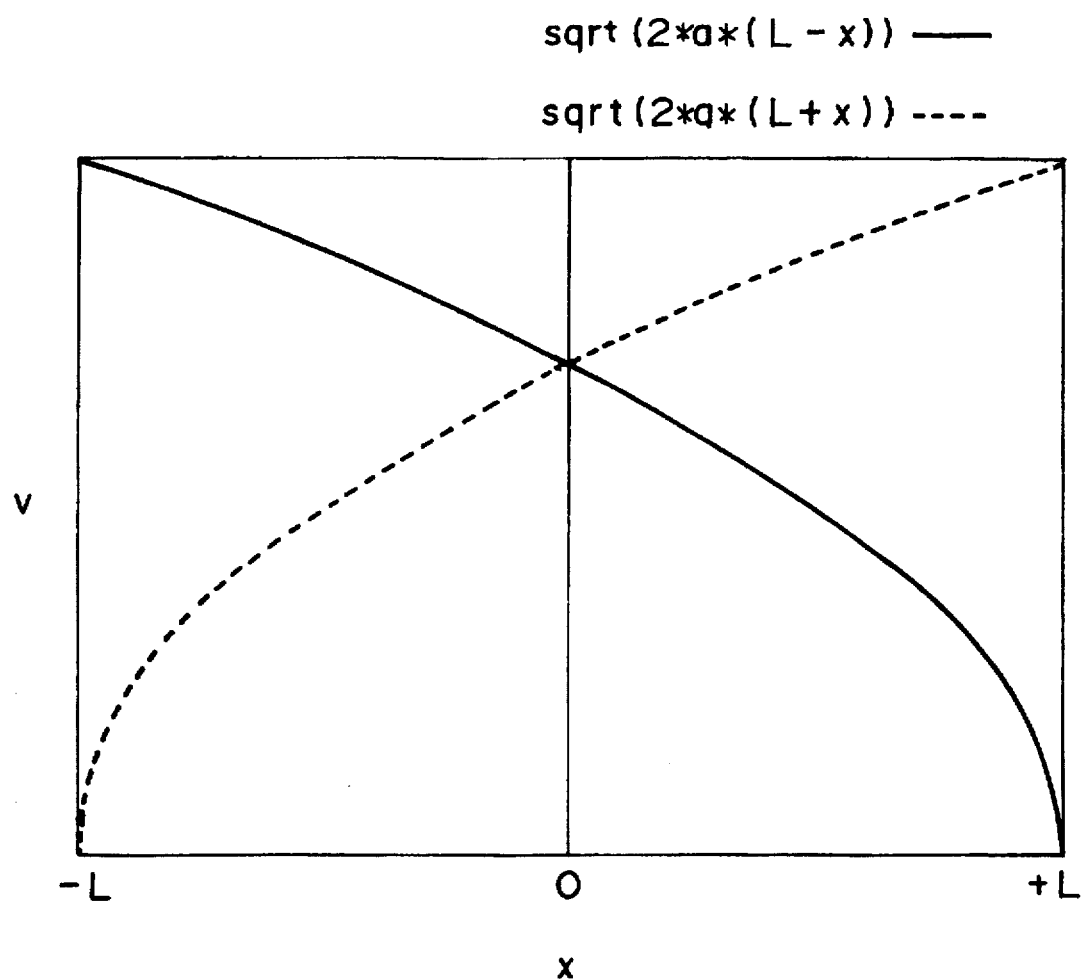
FIG. 2 is a graph for explaining tolerable maximum speed in a uncontrolled running detection routine in the positioning control system of FIG. 1.

Showing equation (1) in a graph, the result such as shown in FIG. 2 is obtainable. In the graph of FIG. 2, the axis of ordinates represents the speed v of the stage 1, and the axis of abscissas represents the position x of the stage 1. In the axis of abscissas, the reference +L denotes the soft limit at the positive side, while the reference −L denotes the soft limit at the negative side. If, when the stage 1 is being moved in the positive direction, the speed as depicted by a solid line is exceeded, "uncontrolled running" is discriminated. If when the stage 1 is being moved in the negative direction, the speed as depicted by a broken line is exceeded, also "uncontrolled running" is discriminated.

As an alternative, because it may take a relatively long time to calculate a square root with an ordinary microprocessor, equation (2) such as below may be used:

$$v^2 > 2a(L-x) \quad (2)$$

In an occasion where, in the ordinary servo operation routine 8, there occurs incorrect parameter inputting or there is a bug in the program, an incorrect drive signal is applied to the D/A converter 9. This may result in uncontrolled running of the stage 1. In that case, when the speed v of the stage 1 increases and it goes beyond the speed with which the stage is able to be stopped at or before the soft limit switch with an acceleration a and, thus, the uncontrolled running detection routine 10 discriminates occurrence of uncontrolled running, the switch 14 substitutes the servo operation routine by the emergency stoppage servo operation routine 12. In response, the emergency stoppage operation routine 12 functions to decrease the speed of the stage I to zero, with the maximum acceleration a tolerable to the stage 1, whereby the stage 1 is stopped.

The speed at the moment at which the servo operation has just changed to the emergency stoppage servo operation, is higher than the speed with which the stage is able to be stopped at or before the soft limit position with the acceleration a. However, since the uncontrolled running detection routine 10 continuously monitors the speed of the stage 1, the actual movement speed of the stage does not exceed this speed largely. As a result, while the position where the stage 1 is stopped at a zero speed is beyond the soft limit position, the stage is able to be stopped in a range after the soft limit position but before the mechanical stopper position.

Also, even if there occurs incorrect parameter inputting or a bug of the program, in the ordinary servo operation routine 8, it is assured to stop the stage without uncontrolled running or overrunning because the emergency stoppage servo operation routine 12 is provided completely independently of the ordinary servo operation routine.

Figure 3:
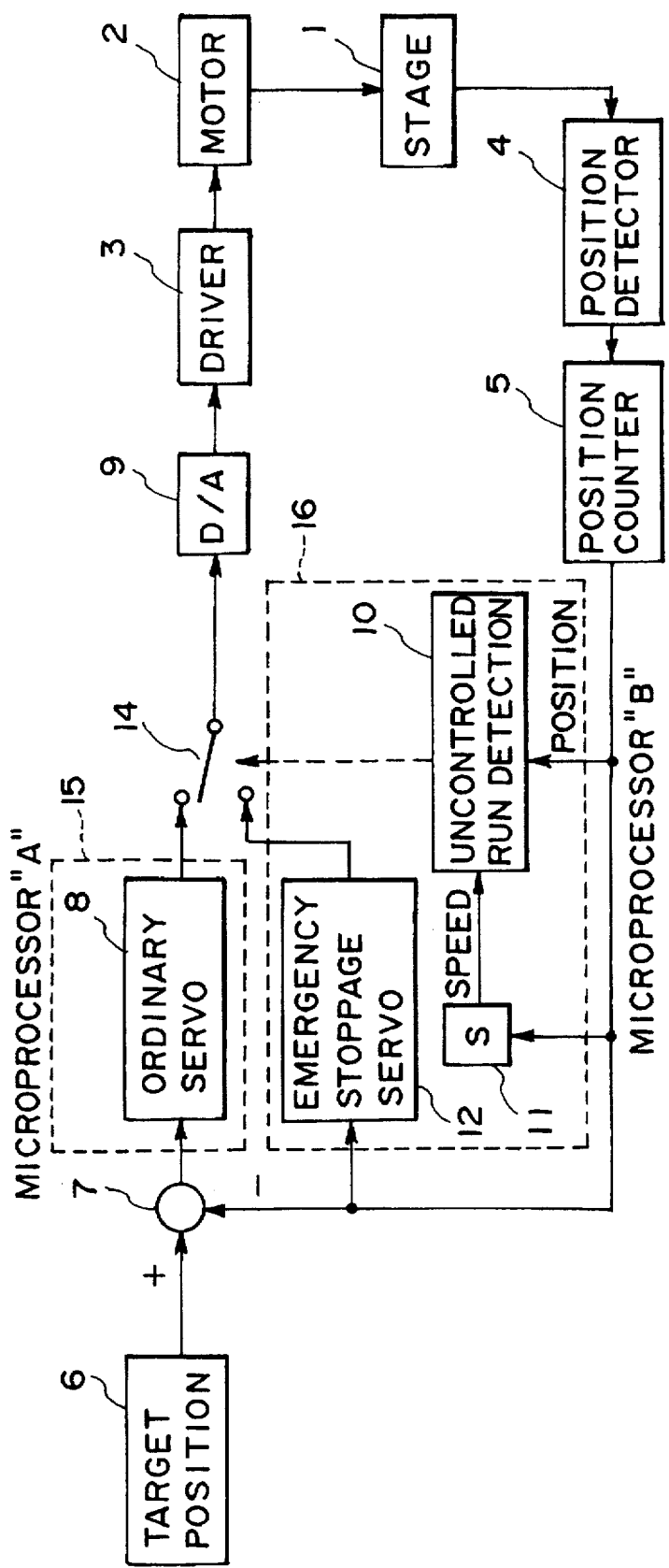
FIG. 3 is a block diagram of a positioning control system according to another embodiment of the present invention.

FIG. 3 is a block diagram of a stage positioning control system according to another embodiment of the present invention. This embodiment differs from the embodiment of FIG. 1 in that separate microprocessors are used: that is, in addition to a microprocessor A (15) for performing ordinary servo operation, there is a microprocessor B (16) for performing uncontrolled running detection and emergency stoppage servo operation.

In an ordinary state, the microprocessor A (15) is used to perform the positioning servo control. The microprocessor B

(16) monitors any uncontrolled running. If the microprocessor B (16) detects uncontrolled running or overrunning, the servo operation routine is changed from the microprocessor A (15) to the microprocessor B (16).

With this arrangement, if the microprocessor A (15) becomes out of order and uncontrolled running of the stage is caused (so that the microprocessor A (15) does not operate to execute the program correctly), the microprocessor B (16) is able to function to stop the stage 1 safely.

While the invention has been described with reference to the structures disclosed herein, it is not confined to the details set forth and this application is intended to cover such modifications or changes as may come within the purposes of the improvements or the scope of the following claims.

What is claimed is:

1. A positioning control system for positioning a movement member with respect to a predetermined position on the basis of feedback control of driving means for the movement member, said system comprising:

extraordinary movement detecting means for detecting extraordinary movement of the movement member; and emergency stoppage servo means for applying a signal for stopping said driving means in response to output of a detection signal from said extraordinary movement detecting means, wherein said extraordinary movement detecting means discriminates occurrence of uncontrolled running of the movement member when the movement member exceeds a tolerable maximum speed which is predetermined with respect to a current position of the movement member.

2. A system according to claim 1, wherein the tolerable maximum speed corresponds to a speed at which the movement member is able to be stopped within a movable range of the movement member from the current position thereof, with an acceleration not larger than a tolerable acceleration.

3. A system according to claim 1, wherein said emergency stoppage servo means is arranged to stop the movement member at an acceleration which is tolerable to the movement member.

4. A system according to claim 1, further comprising (i) current position detecting means for detecting a current position of the movement member and for producing a corresponding current position signal and (ii) ordinary servo means for applying, to said driving means, a drive signal to move and place the movement member at a predetermined target position on the basis of a difference between a corresponding target position signal and the current position signal, wherein said extraordinary movement detecting means detects extraordinary movement of the movement member on the basis of a current position signal and wherein said emergency stoppage servo means applies an emergency stoppage signal to said driving means on the basis of a current position signal.

5. A system according to claim 4, wherein said ordinary servo means includes a first microprocessor and wherein said emergency stoppage servo means includes a second microprocessor different from said first microprocessor.

* * * * *

UNITED STATES PATENT AND TRADEMARK OFFICE
CERTIFICATE OF CORRECTION

PATENT NO. : 5,663,622
DATED : September 2, 1997
INVENTOR(S) : Sekiguchi

It is certified that error appears in the above-indentified patent and that said Letters Patent is hereby corrected as shown below:

COLUMN 1:

Line 47, "case," should read --a case,--.

COLUMN 4:

Line 39, "I" should read --1--.

Signed and Sealed this

Tenth Day of March, 1998

Attest:

BRUCE LEHMAN

Attesting Officer       Commissioner of Patents and Trademarks